United States Patent [19]
Uchida

[11] 3,824,616
[45] July 16, 1974

[54] AIR-JET CROSSOVER FOR AUTOMATIC FILM PROCESSORS

[75] Inventor: Kazuhiko Uchida, Kyoto, Japan

[73] Assignee: LogElectronics Inc., Springfield, Va.

[22] Filed: May 7, 1973

[21] Appl. No.: 357,738

[30] Foreign Application Priority Data
Sept. 28, 1972  Japan............................. 47-113079

[52] U.S. Cl.................................. 354/339, 226/97
[51] Int. Cl........................................... G03d 3/12
[58] Field of Search............. 95/89 R, 94 R; 226/97

[56] References Cited
UNITED STATES PATENTS
| | | | |
|---|---|---|---|
| 3,192,845 | 7/1965 | Schmidt............................. | 95/89 R |
| 3,245,334 | 4/1966 | Long................................. | 95/89 R |
| 3,276,425 | 10/1966 | Rabb................................. | 226/97 X |

*Primary Examiner*—Fred L. Braun
*Attorney, Agent, or Firm*—Elliott I. Pollock

[57] ABSTRACT

An automatic film processor, of the type comprising a plurality of treatment tanks associated with a transport system for transporting a sheet of film to be processed through said tanks in succession, is provided with an improved crossover guide structure positioned between an adjacent pair of the tanks for guiding a sheet of film as it is transported from one to the next of said pair of tanks. An air blower and associated duct are provided to produce positive air pressure adjacent the interior of the crossover guide structure to pneumatically urge a sheet of film away from the guide structure as the sheet is transported past the guide structure, to minimize faulty processing or scratching of the film sheet.

6 Claims, 2 Drawing Figures

3,824,616

AIR-JET CROSSOVER FOR AUTOMATIC FILM PROCESSORS

BACKGROUND OF THE INVENTION

The present invention relates to film transport systems for use in automatic film processors, and is more particularly concerned with an improved crossover guide structure forming a portion of such an automatic film transport system.

Automatic film processors are, per se, well known. Such processors typically contain a developing tank, a fixing tank, and a wash tank; and a transport system, comprising for example a plurality of belts, or rollers, or combinations of belts and rollers, is provided to transport a sheet of film being processed through each of said tanks and thence into the next of said tanks in a predetermined operating sequence.

At the present time, film transport systems for use in automatic film processors have taken three basic forms: (a) a roller transport system consisting of pairs of opposed rollers positioned along the film transport path and coacting with one another to move a sheet of film along said path, (b) a roller transport system comprising a plurality of rollers disposed in staggered relation to one another on opposing sides of the transport path, or (c) a composite belt-roller transport system consisting of drive rollers associated with drive belts positioned on opposing sides of the transport path. The present invention is adapted for use with any of these types of transport systems.

The transport system employed customarily comprises a plurality of transport modules, of one of the aforementioned types, disposed respectively within the several treatment tanks for guiding a sheet of film being processed through each tank; and a crossover mechanism is provided between each adjacent pair of said tanks for guiding a sheet of film out of one tank and into the next tank. These crossover mechanisms characteristically take one of two basic forms, namely (1) a plurality of opposed drive rollers disposed in an arcuate array extending from the top of one tank to the top of the next adjacent tank for guiding a sheet of film between said tanks, or (2) a fixed guide structure having an arcuate or curved guide surface, positioned to be engaged by the leading edge of a sheet of film being transported, for guiding said sheet of film from one tank to the next. The present invention relates to a crossover guide structure of the latter type, and is primarily concerned with an improved such guide structure wherein defective development, defective fixing, and scratching of the emulsion side of the film is avoided as the film sheet is moved past such a fixed guide structure.

In film transport systems having fixed, curved crossover guide structures of the type described above, relatively thin films, e.g., films having a thickness less than 0.1 mm, are normally guided from one tank to the next smoothly, and without contacting the crossover guide structure at all. However when the sheet of film being transported is comparatively thick and tough, e.g., the film sheet has a thickness in the order of 0.1 to 0.175 mm., it is guided from one tank into the next with its leading edge in contact with the guide structure. In theory, the crossover guide structure exhibits a shape which permits the film sheet to be guided from one tank into the next with its leading edge only in contact with the guide; but in practice, when the leading edge of the film sheet engages the guide structure, it tends to move more slowly than the remainder of the film sheet and, as a result, contact often occurs between the guide structure and the emulsion side of the film itself. When such contact does occur, if there should be a residue of processing fluid such as developer solution on the guide structure, that portion of the film sheet which contacts the guide may become over-developed (or it may be defectively fixed, in the event that a residue of fixer is on the guide structure); and, in addition, such contact between the guide structure and film sheet may even scratch the emulsion side of the film, particularly if the guide structure carries a crystallized residue of processor fluid thereon.

The present invention is intended to obviate the foregoing disadvantages.

SUMMARY OF THE INVENTION

In accordance with the present invention, the fixed crossover guide structure located between a pair of adjacent treatment tanks is modified to include pressure generating means operative to produce positive air pressure, or one or more jets of air, adjacent a limited interior portion of the crossover guide structure. The pressure generating means may comprise, for example, an air compressor or blower the outlet of which is coupled, via an appropriate duct or conduit, to the interior guiding surface of the crossover structure, preferably at a location downstream of the mid-point of said guiding surface. The positive air pressure thus produced operates to pneumatically deflect or urge the leading edge of a sheet of film away from said guide structure, when said leading edge encounters said increased air pressure. As a result, the leading edge of the film sheet tends to be transported as fast as, or even faster than, the remainder of the film sheet whereby, after the leading edge of a comparatively thick film sheet encounters said increased pressure, said comparatively thick film sheet is transported along a crossover path similar to that which occurs in the case of a comparatively thin film sheet, i.e, without contacting the crossover guide structure at all.

BRIEF DESCRIPTION OF THE DRAWINGS

The foregoing construction, operation, and advantages of the present invention will become more readily apparent from the subsequent description and accompanying drawings wherein.

DESCRIPTION OF THE PREFERRED EMBODIMENTS

Figure 1:
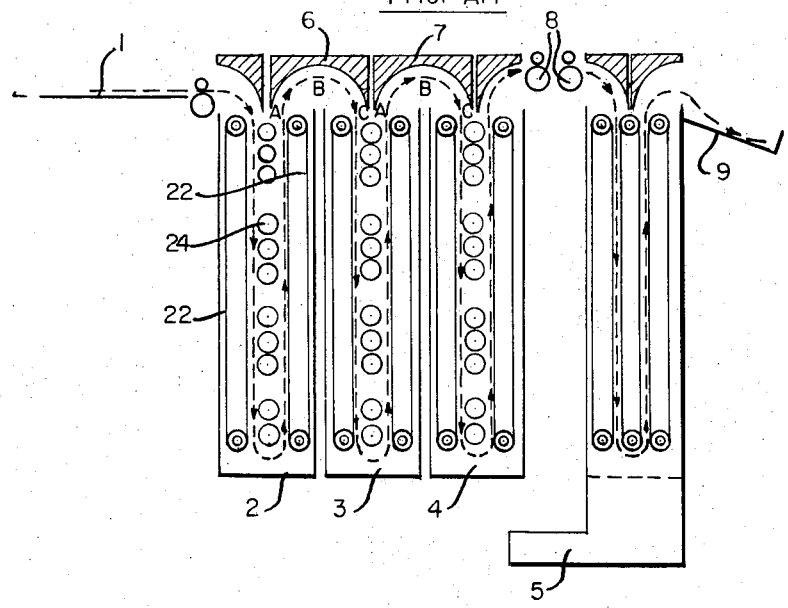
FIG. 1 is a diagrammatic side view of a conventional automatic film processor employing a belt/roller transport system, but not incorporating the present invention.

In order that the invention, to be described subsequently with reference to FIG. 2, can be more fully appreciated, reference will first be made to FIG. 1 which depicts an automatic film processor incorporating a known film transport system of the belt/roller type. In this prior art arrangement, a sheet of film to be processed is fed, emulsion side up, into the processor over a feed tray 1. The film sheet is then transported through a developer tank 2, is guided from the exit thereof by a fixed crossover guide 6 into a fixing tank 3, is transported through said fixing tank 3 and then guided by crossover guide 7 into a wash tank 4, and, thereafter, passes through a pair of squeegee rollers 8 into and through a drier 5, whereafter the dried sheet of film, fully processed, is transported into a catch tray 9. The transport system comprises a plurality of modules located respectively in each of said tanks, e.g., belts 22 associated with rollers 24, for transporting the sheet of film through each tank along the path shown in broken line, and each such module cooperates with a fixed crossover guide structure such as 6 or 7 for guiding the film from one tank into the next.

In practice, when the sheet of film being processed is comparatively thin, as the sheet exits from one tank it tends to be deflected, under the influence of gravity, into an arcuate path which naturally leads it into the entry of the next tank, i.e, such a thin film sheet does not engage the fixed guide 6 or 7 at all. When a comparatively thick sheet of film is being processed, however, it tends to exit from each tank in a vertical orientation, and the leading edge of such a thick film sheet then contacts the fixed guide 6 or 7 so that, as the transport operation continues, the sheet of film is deflected along an arcuate path corresponding to the curvature of the fixed guide into the next successive tank. Since film exiting from developer tank 2 contains developer fluid thereon, a portion of said fluid tends to be transferred to fixed guide 6, and becomes crystallized thereon, after the processor has been in operation for a period of time. This tends to increase the resistance between guide 6 and sheets of film being guided from tank 2 into tank 3. Similarly, comparatively thick sheets of film being transported from fixing tank 3 into wash tank 4 tend to leave a residue of fixing fluid on fixed guide 7, thereby increasing the contact resistance of the sheet of film being transported in this portion of the transport system as well.

The foregoing fluid residues on fixed guides 6 and 7 cause no difficulty at the portions of each guide designated A–B, i.e., at this entry portion of the guide the angle at which the guide and film sheet meet one another is comparatively small. However at the latter portion of each guide, e.g., in the region designated B–C, the increased contact resistance between the sheet of film and its associated cross-over guide tends to cause the conveying speed of the leading edge of the film to slow down and, as a result, the remainder of the film sheet tends to move somewhat faster than the leading edge thereof so that the emulsion side of the film sheet can actually come into contact with the curved guide surface as the angle between the leading edge of the film sheet and the guide surface gradually increases. When the emulsion side of the film sheet contacts guide 6 between developing tank 2 and fixing tank 3, any residue of developer solution on guide 6 may cause the contacted portion of the film sheet to be overdeveloped. Similarly, when the emulsion side of the film sheet contacts guide 7, between fixing tank 3 and wash tank 4, any residue of fixing fluid on guide 7 may cause the contacted portion of the film sheet to be defectively fixed. These problems are aggravated, moreover, by the fact that, after a period of time, residues of the processor fluid adhering to crossover guides 6 and 7 tend to crystallize, and when this occurs the crystallized residues may even produce scratches on the emulsion side of the film sheet being processed.

Figure 2:
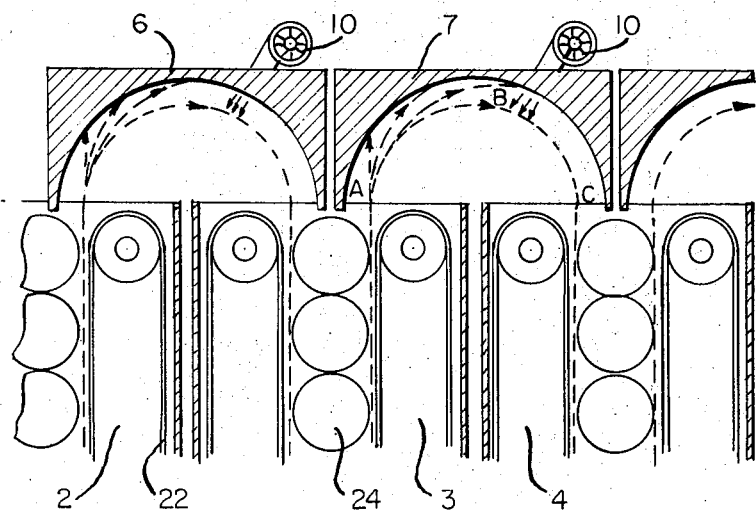
FIG. 2 is a diagrammatic side view of a portion of the structure shown in FIG. 1, incorporating the improved film transport system of the present invention.

In order to avoid the foregoing disadvantages, at least one of the fixed crossover guide structures (and preferably all of said crossover guide structures) is modified in accordance with the arrangement shown in FIG. 2. More particularly, each crossover guide structure is associated with an air blower or compressor the outlet of which is coupled, via a duct or conduit 10, to the interior guiding surface of fixed guide 6 and/or 7. As a result, a jet of air emanates from a limited interior portion of the guide structure and this limited portion of the guide structure preferably located in the region designated B–C, i.e., at a point along the transport path which is closer to the downstream one of the two treatment tanks, with the air jet being directed downwardly and rearwardly relative to the path of travel of the leading edge of the film sheet past the guide structure.

As shown by the various broken line arrows adjacent crossover guide structures 6 and 7 in FIG. 2, the added pressure generating means has no effect on the guiding function of the guide structure in the region A–B, i.e., the leading edge of a comparatively thick film sheet still engages the interior guide surface at the entry half of each guide to deflect the film sheet into the curved transport path necessary to direct the leading edge toward the entry of the next adjacent treatment tank. However when the leading edge passes point B, ie, when it would tend to be slowed down in the prior art crossover guide structure, it encounters the increased air pressure provided by conduit 10 and, as a result, is pneumatically urged away from the curved guide surface in the region B–C. The leading edge of the film sheet accordingly tends to move as fast as, or even faster than, the remainder of the film sheet, i.e., the internal resistance of the film sheet is brought into a state of equilibrium with the increased air pressure so that the comparatively thick sheet of film is conveyed into the next successive tank along a guide path substantially identical to that which would be present in the case of the thinner film sheet, without contacting the guide structure at all.

As will be apparent to those skilled in the art, the air pressure supplied by each conduit 10, to provide the operation described above, must be properly selected. If the air pressure is too low, it will obviously be ineffective. Conversely, if the air pressure is too high, it may tend to blow processor fluid off the film surface, which is also undesirable. An increase in air pressure of approximately 1.5 kg/cm$^2$ has been found to be appropriate for photographic films having a thickness of substantially 0.175mm.

While I have thus described a preferred embodiment of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described my invention, I claim:

1. In an automatic film processor of the type comprising a plurality of treatment tanks associated with a transport system for transporting a sheet of film to be processed through said tanks in succession, and wherein a crossover guide structure is positioned between an adjacent pair of said tanks for guiding a sheet of film between said tanks, said guide structure having a stationary arcuate guide surface extending in a smooth curve from the outlet of one of said tanks to the inlet of the next adjacent one of said tanks, said arcuate guide surface being positioned to be engaged by the leading edge of the sheet of film to deflect said leading edge and thereby said sheet of film along an arcuate path as said sheet of film is transported from said one to the next of said pair of tanks, the improvement wherein pressure generating means are provided for producing positive air pressure adjacent a limited interior portion of said guide surface to pneumatically urge a sheet of film away from said limited portion of said guide surface as said sheet of film is transported from said one tank past said arcuate guide surface toward said next tank, said limited interior portion being located downstream of the outlet of said one of said tanks to permit the leading edge of a sheet of film emerging from the outlet of said one tank to engage and be guided by said arcuate guide surface prior to encountering said positive air pressure whereafter said leading edge is urged away from said arcuate guide surface by said air pressure as said leading edge progresses toward the inlet of said next tank.

2. The structure of claim 1 wherein said limited interior portion of said guide surface is disposed closer to said next tank than to said one of said tanks along the path of transport of said sheet of film past said guide surface.

3. The structure of claim 1 wherein said pressure generating means comprises an air blower, and a conduit for directing a jet of air from the outlet of said blower to the interior of said guide surface.

4. The structure of claim 1 wherein said processor includes a plurality of said crossover guide structures disposed respectively between adjacent pairs of said treatment tanks, said pressure generating means including means for producing positive air pressure adjacent said limited interior portion of each of said guide surfaces.

5. The structure of claim 4 wherein said pressure generating means comprises a plurality of conduits for causing air under pressure to emanate, in the form of an air jet, from a limited interior portion of each of said plurality of arcuate guide surfaces respectively.

6. The structure of claim 1 wherein said pressure generating means comprises means producing an air jet which emanates from a point downstream of the midpoint of the smoothly curved interior surface of said guide surface, said jet being directed downwardly and rearwardly relative to the transport path of the leading edge of a sheet of film past said guide surface.

* * * * *